United States Patent [19]

Okutsu

[11] Patent Number: 4,937,692
[45] Date of Patent: Jun. 26, 1990

[54] CRASH STOP FOR MAGNETIC DISK DRIVE

[75] Inventor: Naohiro Okutsu, Kamakura, Japan

[73] Assignee: Mitsubishi Denki K.K., Tokyo, Japan

[21] Appl. No.: 265,518

[22] Filed: Nov. 1, 1988

[30] Foreign Application Priority Data

Dec. 22, 1987 [JP] Japan ............................ 62-194448[U]

[51] Int. Cl.$^5$ .................................................. G11B 5/54
[52] U.S. Cl. ........................................ 360/105; 360/106
[58] Field of Search .................................. 360/105, 106

[56] References Cited

U.S. PATENT DOCUMENTS

| 4,110,802 | 8/1978 | Ho et al. | 360/106 |
| 4,635,151 | 1/1987 | Hazebrouck | 360/105 |
| 4,716,482 | 12/1987 | Walsh | 360/106 |

FOREIGN PATENT DOCUMENTS 55-072272  5/1980  Japan .
57-009973  2/1982  Japan .

OTHER PUBLICATIONS

Luoma et al., "Elastomer Crash Stop for Disk Files", IBM TDB, Jan. 1977, vol. 19, No. 8, pp. 3175–3176.

Primary Examiner—David J. Severin
Attorney, Agent, or Firm—Kanesaka & Takeuchi

[57] ABSTRACT

A magnetic disk drive includes a braking mechanism for controlling a braking force to the arm to position the magnetic head over a magnetic disk. The braking force, which is normally not applied to the magnetic head arm, is applied to the head arm when the magnetic head leaves a region which is somewhat smaller than the data recording region.

5 Claims, 3 Drawing Sheets

CRASH STOP FOR MAGNETIC DISK DRIVE

BACKGROUND OF THE INVENTION

This invention relates generally to magnetic disk drives and, more particularly, to a mechanism for positioning the magnetic head of a magnetic disk drive.

FIG. 5 is a plan view showing the magnetic head arm drive mechanism of a conventional magnetic disk. FIG. 6 shows the movable range of a conventional magnetic head and its data recording region. FIG. 7 shows the velocity profile of a conventional magnetic head.

In the Figures, designated at 1 is a magnetic disk; at 2 a magnetic head; at 3 a support arm for the magnetic head 2; at 4 a support point of the arm 3; at 6 a stopper for preventing movement of the arm 3 beyond the outer boundary of flyable region; and at 7 a stopper for preventing movement of the arm 3 beyond the inner boundary of flyable region.

Character A represents the movable range within which the magnetic head is able to fly over the magnetic disk 1. Character B represents the data region in which data is recorded in the magnetic disk 1. Character C represents a contact start and stop (CSS) region for the magnetic head 2.

The operation of the conventional magnetic disk of FIG. 5 will be explained below. When the magnetic disk 1 is stationary, the arm 3 makes contact with the inner edge stopper 7, and the magnetic head 2 is on the CSS region C of the magnetic disk 1.

When the magnetic disk 1 starts to rotate, the magnetic head 2 takes off. When the rotation speed of the magnetic head reaches a predetermined value, the arm 3 moves toward the disk's outer edge to position the magnetic head 2 at the disk's data recording region B. The arm 3 is then driven by the linear motor 5 so that the magnetic head 2 moves within the range of the data recording region B. When electric power is turned off, the arm 3 returns by spring tension to the position of stopper 7. The movement of the magnetic head 2 at the data recording region B is caused by controlling the arm 3 according to the velocity profile shown in FIG. 7.

With the conventional magnetic disk, the arm 3 is driven so that the magnetic head 2 may move in the data recording region B at the highest possible speed. Under this condition, if the control circuit should allow an error, the arm 3 accelerates so fast that it can pass the data recording region B and strike stopper 6 or 7 with great impact. These stoppers, therefore, must be large and strong enough to withstand such an impact to halt the arm 3 at normal position. In addition, the motion range A, which permits the gliding of a magnetic head 2 must be made wide compared with the data region B. These required larger components result in higher cost and decreased reliability.

SUMMARY OF THE INVENTION

Accordingly, it is an object of the invention to provide a low cost magnetic disk with high reliability and a simple stopping mechanism without the need for a large movable range for the magnetic head.

This object may be achieved by a control mechanism according to the invention which controls a braking force applied to the arm when the magnetic head is off the data recording region.

This and other objects, features and advantages attendant to this invention will become more apparent from the following description when it is read in conjunction with the accompanying drawings.

DESCRIPTION OF THE PREFERRED EMBODIMENT

Figure 1:
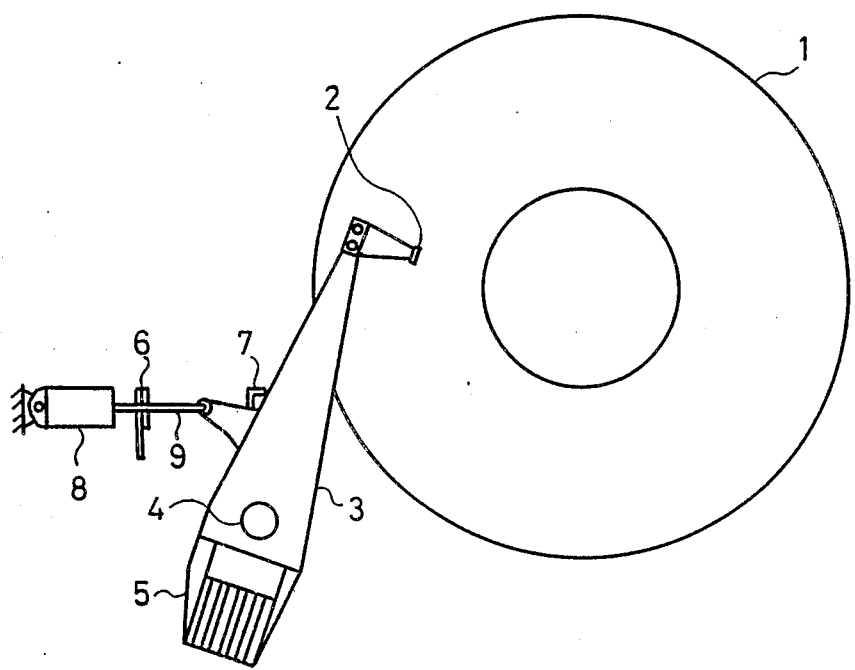
FIG. 1 is a plan view of a magnetic disk drive according to an embodiment of the invention.

FIG. 1 shows a magnetic head arm drive mechanism according to an embodiment of the invention. Designated at 1 is a magnetic disk; at 2 a magnetic head; at 3 an arm; at 4 a supporting point of the arm 3; at 5 a linear motor; at 6 an outer stopper; and at 7 is an inner stopper. They are the same as those of FIG. 2. An air damper 8 consists of a piston connected to the arm 3 by a rod 9 and an air cylinder which the piston fits in.

Figure 2:
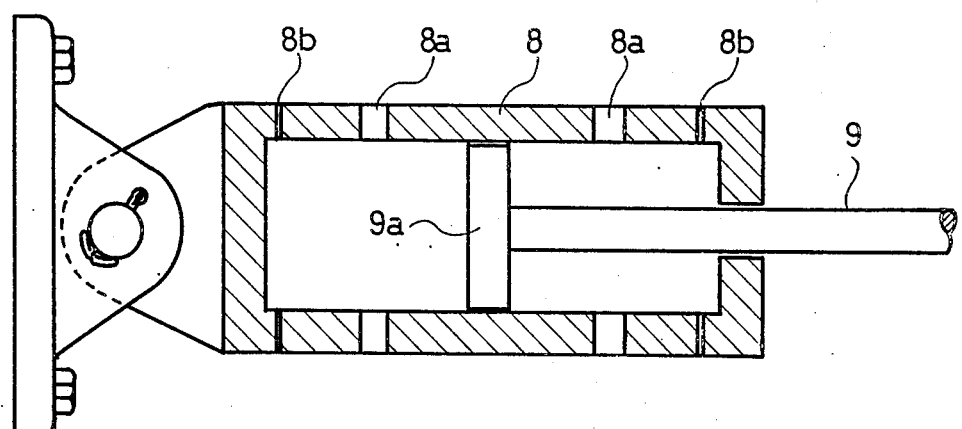
FIG. 2 is an enlarged sectional view of the air damper useful for the magnetic disk drive of FIG. 1.
Figure 3:
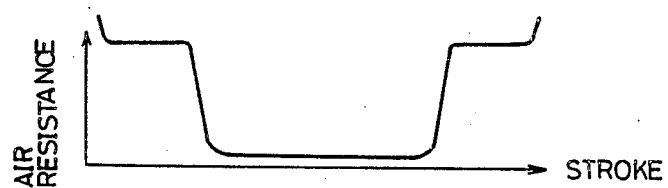
FIG. 3 is a graph showing the air resistant force vs. the stroke of a piston.

In FIG. 2, the location of the ports 8a and 8b on the air damper 8 is determined so that the air resistant force in the air damper 8 is represented by the curve of FIG. 3 while the cylinder head 9 moves within the cylinder 8.

Figure 4:
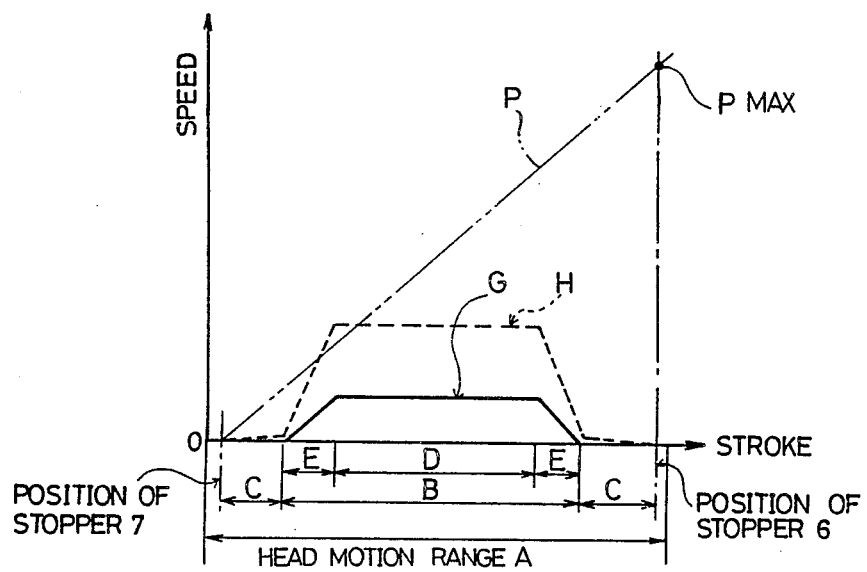
FIG. 4 is a graph showing the moving velocity of a magnetic head in each region.
Figure 5:
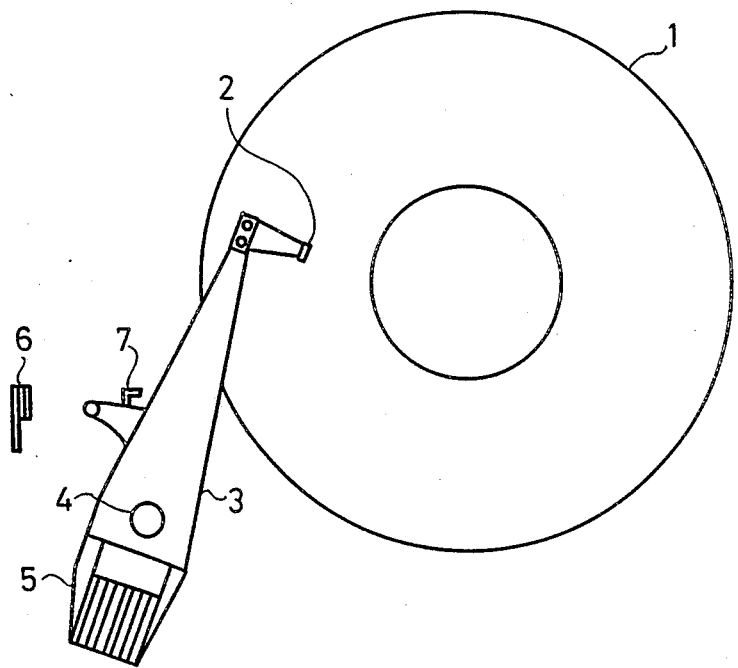
FIG. 5 is a plan view of a conventional magnetic disk drive.
Figure 6:
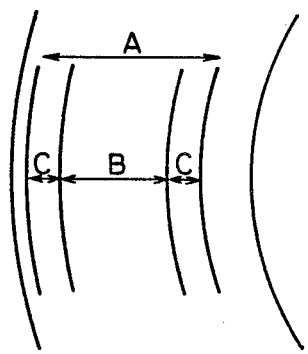
FIG. 6 is a plan view of part of a disk showing the movable range and data region of a magnetic disk.
Figure 7:
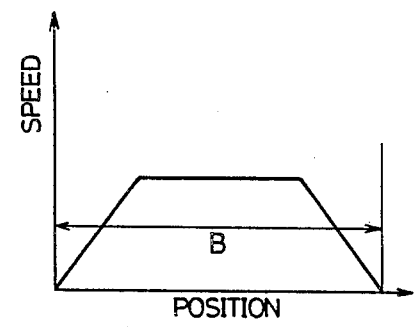
FIG. 7 is a graph showing the moving velocity vs. the position of a magnetic head.

While the magnetic head 2 is within the maximum speed region D in the data recording region B, no braking force is applied to the arm 3 because the air resistant force is almost zero in the damper 8. However, when the magnetic head 2 reaches the region E and C, braking force is applied to the arm 3 by the air resistant force generated in the air damper 8. The magnetic head 2 is moved in each region by the air damper 8 as shown by the solid line G of FIG. 4. The dotted line H shows the controlled maximum speed range.

The arm 3 should move at maximum speed to shorten positioning time of the magnetic head 2. For this reason, the linear motor 5 which drives the arm 3 is designed to provide the maximum power. Therefore, if an error occurs in the control system and the speed becomes uncontrollable, the magnetic head 2 accelerates according to the chain line P of FIG. 4 and leaves the data recording region B.

If this should happen, the arm 3 may impact with the stopper 6 or 7 at maximum speed (Pmax). According to the invention, a braking force is applied by the air damper 8 when the arm 3 comes to the point E where the magnetic head 2 comes to almost the end of the data recording region B. The speed of magnetic head 2 is quickly reduced and, consequently, so is the impact upon the stopper 6 or 7. As a result, it is possible not only to simplyfy the structures of stoppers 6 and 7 but also to reduce the movable range A in which the magnetic head 2 is able to fly and move over the magnetic disk 1.

In the above embodiment, the air damper is used as the control mechanism, but other control mechanisms may be used, e.g., oil and friction dampers.

As explained above, this invention provides a control mechanism for applying a braking force to the arm that positions the magnetic head on a magnetic disk. This force is not applied when the magnetic head is in the data recording region of a magnetic disk, but it is applied when the magnetic head leaves the data recording region. This permits a simple stopper and a smaller movable range for the magnetic head and results in a reliable and inexpensive magnetic disk drive.

What is claimed is:

1. A crash stop for a magnetic disk drive which includes a rotatable magnetic disk; a magnetic head for magnetically recording or reproducing data out of said magnetic disk; an arm on which said magnetic head is mounted; a driving mechanism for driving said arm so that said magnetic head moves in a radial direction of said magnetic disk; and a pair of stoppers for restricting movement of said arm within a head moving range on said magnetic disk which consists of a data recording region and a pair of contact start and stop regions at opposite ends of said data recording region; wherein the improvement comprises:

a braking mechanism coupled to said arm for applying a braking force to said arm when said magnetic head leaves a maximum speed region which is slightly smaller than said data recording region on said magnetic disk.

2. The crash stop for a magnetic disk drive of claim 1, wherein said braking mechanism is an air damper.

3. The crash stop of claim 2, wherein said air damper comprises:

a piston connected to said arm via a rod; and an air cylinder in which said piston is movable, said air cylinder having at least a pair of first ports near opposite ends thereof and a pair of second ports between said first ports, said second ports having a diameter larger than that of said first ports so that said piston is movable with smaller resistance between said second ports than between said first and second ports.

4. The crash stop for a magnetic disk drive of claim 1, wherein said braking mechanism is an oil damper.

5. The crash stop of claim 4, wherein said oil damper comprises:

a piston connected to said arm via a rod; and an air cylinder in which said piston is movable, said air cylinder having at least a pair of first ports near opposite ends thereof and a pair of second ports between said first ports, said second ports having a diameter larger than that of said first ports so that said piston is movable with smaller resistance between said second ports than between said first and second ports.

* * * * *